(12) United States Patent
Park et al.

(10) Patent No.: US 9,804,451 B2
(45) Date of Patent: Oct. 31, 2017

(54) LIQUID CRYSTAL DISPLAY

(71) Applicant: Samsung Display Co. Ltd., Yongin (KR)

(72) Inventors: Kee Bum Park, Cheonan-si (KR); Yoo Mi Ra, Ansan-si (KR); Hyung Jin Song, Seongnam-si (KR); Kye Uk Lee, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 15/005,601

(22) Filed: Jan. 25, 2016

(65) Prior Publication Data

US 2016/0377934 A1 Dec. 29, 2016

(30) Foreign Application Priority Data

Jun. 23, 2015 (KR) .................. 10-2015-0088953

(51) Int. Cl.
*G02F 1/1343* (2006.01)
*G02F 1/1368* (2006.01)
(Continued)

(52) U.S. Cl.
CPC ...... *G02F 1/134309* (2013.01); *G02F 1/1368* (2013.01); *G02F 1/13624* (2013.01);
(Continued)

(58) Field of Classification Search
CPC ........... G02F 1/134309; G02F 1/13624; G02F 2001/134345; G02F 2001/1357;
(Continued)

(56) References Cited

U.S. PATENT DOCUMENTS 9,013,664 B2 * 4/2015 Chen .................. G02F 1/1333
349/129
9,213,209 B2 * 12/2015 Chang .................. G02F 1/139
(Continued)

FOREIGN PATENT DOCUMENTS

KR 1020120104720 9/2012
KR 1020150005000 1/2015
(Continued)

*Primary Examiner* — Joseph L Williams
*Assistant Examiner* — Jose M Diaz
(74) *Attorney, Agent, or Firm* — Cantor Colburn LLP (57) ABSTRACT

A liquid crystal display includes a first display substrate including a plurality of pixel electrodes corresponding to a plurality of pixels, respectively, a second display substrate disposed opposite to the first display substrate; and a liquid crystal layer disposed between the first and second display substrates, where each of the pixel electrodes includes first and second subpixel electrodes, which are disposed near each other in a first direction and each include a plurality of minute branches, the first subpixel electrode is divided into a plurality of first-subpixel areas including a first first-subpixel area, in which the minute branches extend in a first diagonal direction, and the second subpixel electrode includes a plurality of second-subpixel areas including a first second-subpixel area, which is disposed near the first first-subpixel area in the first direction and in which the minute branches extend in the first diagonal direction.

20 Claims, 7 Drawing Sheets

(51) Int. Cl.
    *G02F 1/1362*     (2006.01)
    *G02F 1/1337*     (2006.01)

(52) U.S. Cl.
    CPC ............... *G02F 1/133707* (2013.01); *G02F 2001/134345* (2013.01)

(58) Field of Classification Search
    CPC ....... G02F 2001/134318; G02F 1/1347; G02F 1/0316; G02F 1/134363; G02F 1/133707; G02F 1/1368; G02F 1/134318; G02F 1/134372; G02F 2201/124; G02F 2001/134372
    See application file for complete search history.

(56) References Cited

U.S. PATENT DOCUMENTS

| | | | | |
|---|---|---|---|---|
| 9,348,179 | B2* | 5/2016 | Chen | G02F 1/133707 |
| 9,658,493 | B2* | 5/2017 | Oh | G02F 1/133707 |
| 2011/0025970 | A1* | 2/2011 | Hashimoto | G02F 1/134309 349/139 |
| 2011/0242468 | A1* | 10/2011 | Choi | C08G 8/12 349/129 |
| 2015/0370116 | A1* | 12/2015 | Chae | G02F 1/13394 349/43 |
| 2016/0187731 | A1* | 6/2016 | Li | G02F 1/133753 349/129 |
| 2016/0187739 | A1* | 6/2016 | Iwata | G02F 1/134363 349/42 |
| 2016/0300541 | A1* | 10/2016 | Cheng | G09G 3/3648 |

FOREIGN PATENT DOCUMENTS

| | | |
|---|---|---|
| KR | 1020150012093 | 2/2015 |
| KR | 1020150016014 | 2/2015 |

* cited by examiner

LIQUID CRYSTAL DISPLAY

This application claims priority to Korean Patent Application No. 10-2015-0088953 filed on Jun. 23, 2015, and all the benefits accruing therefrom under 35 U.S.C. §119, the content of which in its entirety is herein incorporated by reference.

BACKGROUND

1. Field

Exemplary embodiments of the invention relate to a liquid crystal display ("LCD").

2. Description of the Related Art

Liquid crystal displays ("LCD"s), which are one of the most widely-used types of flat panel display, typically include two substrates, in which field-generating electrodes such as pixel electrodes and a common electrode are formed provided, and a liquid crystal layer between the two substrates. LCDs apply an electric field to the liquid crystal layer by applying a voltage to the field-generating electrodes to change the alignment of liquid crystal molecules in the liquid crystal layer, and control the polarization of light incident thereupon, thereby displaying an image.

The development of vertical alignment ("VA")-mode LCDs, among other LCS, is underway, and the VA-mode LCDs are a type of LCD in which liquid crystal molecules are aligned in a way such that major axes thereof are arranged to be perpendicular to a substrate when an electric field is not applied.

SUMMARY

Exemplary embodiments of the invention provide a liquid crystal display ("LCD") in which degradation of picture quality that may be caused by a misalignment between two display substrates of a curved display panel is effectively prevented.

Exemplary embodiments of the invention further provide an LCD with improved texture.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, an LCD includes: a first display substrate including a plurality of pixel electrodes corresponding to a plurality of pixels, respectively; a second display substrate disposed opposite to the first display substrate; and a liquid crystal layer disposed between the first and second display substrates. In such an embodiment, each of the pixel electrodes includes first and second subpixel electrodes, which are disposed near each other in a first direction and each include a plurality of minute branches, the first subpixel electrode is divided into a plurality of first-subpixel areas including a first first-subpixel area, in which the minute branches extend in a first diagonal direction, and the second subpixel electrode is divided into a plurality of second-subpixel areas including a first second-subpixel area, which is disposed near the first first-subpixel area in the first direction and in which the minute branches extend in the first diagonal direction.

In an exemplary embodiment, the first-subpixel areas may further include a second first-subpixel area, which is disposed near the first first-subpixel area in a second direction crossing the first direction and in which the minute branches extend in a second diagonal direction crossing the first diagonal direction, and the second-subpixel areas may further include a second second-subpixel area, which is disposed near the first second-subpixel area in the second direction and in which the minute branches extend in the second diagonal direction. In such an embodiment, the second first-subpixel area is disposed near the second second-subpixel area in the first direction.

In an exemplary embodiment, the first-subpixel areas may further include a third first-subpixel area, which is disposed near the first first-subpixel area in the first direction and in which the minute branches extend in a third diagonal direction crossing the first diagonal direction, and a fourth first-subpixel area, which is disposed near the second first-subpixel area in the first direction, and in which the minute branches extend in a fourth diagonal direction crossing the second diagonal direction.

In an exemplary embodiment, the first subpixel electrode may be a high-gray-level electrode, and the second subpixel electrode may be a low-gray-level electrode.

In an exemplary embodiment, each of the first and second subpixel electrodes may further include a stem which extends in at least one of the first and second directions and to which the minute branches are connected.

In an exemplary embodiment, the stem and the minute branches may form an angle of about ±45 or about ±135 degrees.

In an exemplary embodiment, the first and second display substrates may be bent in the first direction.

In an exemplary embodiment, the minute branches may be in a shape of a rectangle or a parallelogram.

According to another exemplary embodiment, an LCD includes: a first display substrate including a plurality of pixel electrodes corresponding to a plurality of pixels, respectively; a second display substrate disposed opposite to the first display substrate; and a liquid crystal layer disposed between the first and second display substrates. In such an embodiment, each of the pixel electrodes includes first and second subpixel electrodes, which are disposed near each other in a first direction and each include a plurality of minute branches, the second subpixel electrode includes a first electrode portion, which is disposed near a side of the first subpixel electrode, a second electrode portion, which is disposed near another side of the first subpixel electrode, and an electrode portion connecting pattern, which connects the first and second electrode portions. In such an embodiment, the first subpixel electrode is divided into a first first-subpixel area, in which the minute branches extend in a first diagonal direction, a second first-subpixel area, which is disposed near the first first-subpixel area in a second direction crossing the first direction and in which the minute branches extend in a second diagonal direction crossing the first diagonal direction, a third first-subpixel area, which is disposed near the first first-subpixel area in the first direction and in which the minute branches extend in a third diagonal direction crossing the first diagonal direction, and a fourth first-subpixel area, which is disposed near the second first-subpixel area in the first direction, and in which the minute branches extend in a fourth diagonal direction crossing the second diagonal direction. In such an embodiment, the first electrode portion of the second subpixel electrode is divided into a first first-electrode-portion area, which is disposed near the first first-subpixel area in the first direction and in which the minute branches extend in the first diagonal direction, and a second first-electrode-portion area, which is disposed near the second first-subpixel area in the first direction and in which the minute branches extend in the second diagonal direction. In such an embodiment, the second electrode portion of the second subpixel electrode is divided into a first second-electrode-portion area, which is disposed near the third first-subpixel area in the first direction and in which the minute branches extend in the third diagonal direction, and a second second-electrode-portion area, which is disposed near the fourth first-subpixel area in the first direction and in which the minute branches extend in the fourth diagonal direction.

In an exemplary embodiment, the first display substrate may further include first, second and third thin-film transistors ("TFT"s), the first TFT may provide a first subpixel voltage to the first subpixel electrode, and the second TFT may provide a second subpixel voltage to the second subpixel electrode along with the third TFT.

In an exemplary embodiment, the first subpixel electrode may be a high-gray-level electrode, and the second subpixel electrode may be a low-gray-level electrode.

In an exemplary embodiment, each of the first and second subpixel electrodes may further include a stem which extends in at least one of the first and second directions and to which the minute branches are connected.

In an exemplary embodiment, the stem and the minute branches may form an angle of ±45 or ±135 degrees.

In an exemplary embodiment, the first and second display substrates may be bent in the first direction.

In an exemplary embodiment, the minute branches may be in a shape of a rectangle or a parallelogram.

In an exemplary embodiment, a width, in the first direction, of the first subpixel electrode may be greater than a width, in the second direction, of the first subpixel electrode.

In an exemplary embodiment, a width, in the first direction, of the first electrode portion of the second subpixel electrode may be greater than a width, in the first direction, of the first first-subpixel area.

In an exemplary embodiment, the first and second electrode portions of the second subpixel electrode may have a smaller width in the first direction than in the second direction.

In an exemplary embodiment, an area of the first subpixel electrode may be larger than an area of each of the first and second electrode portions of the second subpixel electrode.

In an exemplary embodiment, the first subpixel electrode may further include a cross-shaped stem, which includes a horizontal stem and a vertical stem crossing the horizontal stem.

BRIEF DESCRIPTION OF THE DRAWINGS

The above and other features of the inventive concept will become more apparent by describing in detail exemplary embodiments thereof with reference to the attached drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Exemplary embodiments of the invention will hereinafter be described with reference to the accompanying drawings.

Figure 1:
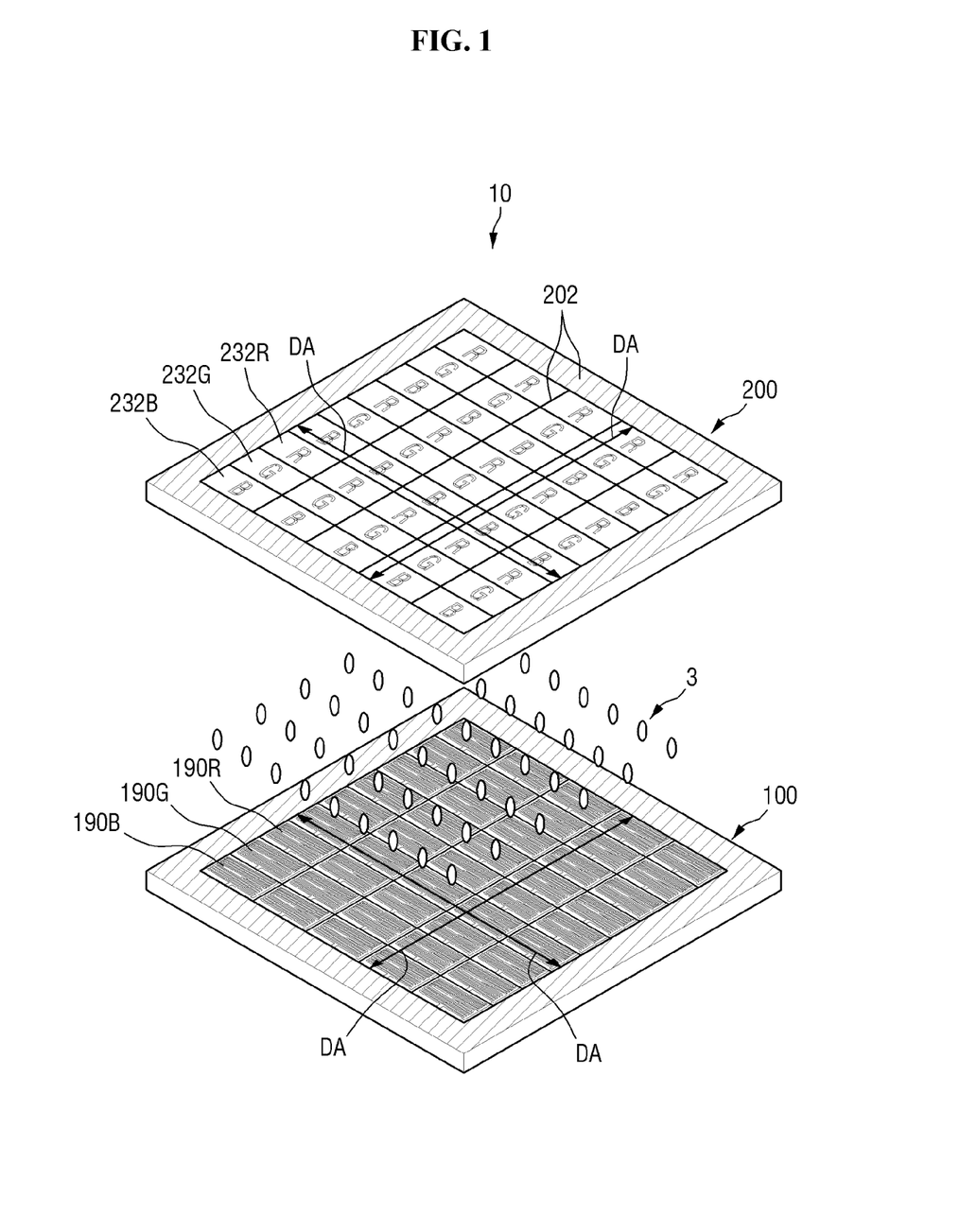
FIG. 1 is an exploded perspective view illustrating a liquid crystal display ("LCD") according to an exemplary embodiment of the invention.

FIG. 1 is an exploded perspective view illustrating a liquid crystal display ("LCD") according to an exemplary embodiment of the invention.

Referring to FIG. 1, an exemplary embodiment of an LCD 10 includes a first display substrate 100, a second display substrate 200 disposed opposite to the first display substrate 100, and a liquid crystal layer 3 interposed between the first display substrate 100 and the second display substrate 200.

Each of the first and second display substrates 100 and 200 includes a display area DA and a non-display area NDA. In the display area DA, a plurality of pixels or pixel areas, which are arranged substantially in a matrix form, may be defined.

In an exemplary embodiment, as shown in FIG. 1, each of the pixels or pixel areas may have a rectangular shape that is wider than long, but the invention is not limited thereto.

In the display area DA of the first display substrate 100, a plurality of pixel electrodes 190 may be respectively included in the pixels or disposed in the pixel areas. Each of the pixel electrodes 190 may be provided with a data voltage via a thin-film transistor ("TFT"). The pixel electrodes 190 may generate an electric field together with a common electrode 270 to control a direction of alignment of liquid crystal molecules in the liquid crystal layer 3 and thus to control the transmissivity of the LCD 10.

In the non-display area NDA of the first display substrate 100, a driving unit, which provides a gate driving signal and a data driving signal to each of the pixels, may be disposed.

In the display area DA of the second display substrate 200, a plurality of color filters 232 may be respectively included in the pixels or disposed in the pixel areas. The color filters 232 may include red color filters 232R, green color filters 232G and blue color filters 232B. The red color filters 232R, the green color filters 232G, and the blue color filters 232B may be alternately arranged. Light-blocking patterns 202 may be disposed along the boundaries between the color filters 232. In an exemplary embodiment, as shown in FIG. 1, the light-blocking patterns 202 may be further disposed in the non-display area NDA of the second display substrate 200. A common electrode 270 (shown in FIG. 3), which is formed in one piece regardless of the distinction between the pixels or integrally formed as a single unitary and indivisible unit, may be disposed on or to cover substantially the entire surface of the display area DA of the second display substrate 200.

Alternatively, at least one of the color filters 232, the light-blocking patterns 202 and the common electrode 270 may be disposed in the first display substrate 100.

The first and second display substrates 100 and 200 may be bonded together by a sealing member (not illustrated), including a sealant. The sealing member may be provided in the non-display area NDA, which corresponds to the periphery of the first and second display substrates 100 and 200.

The liquid crystal layer 3, which includes liquid crystal molecules with positive dielectric anisotropy or negative dielectric anisotropy, may be interposed between the first and second display substrates 100 and 200.

Figure 2:
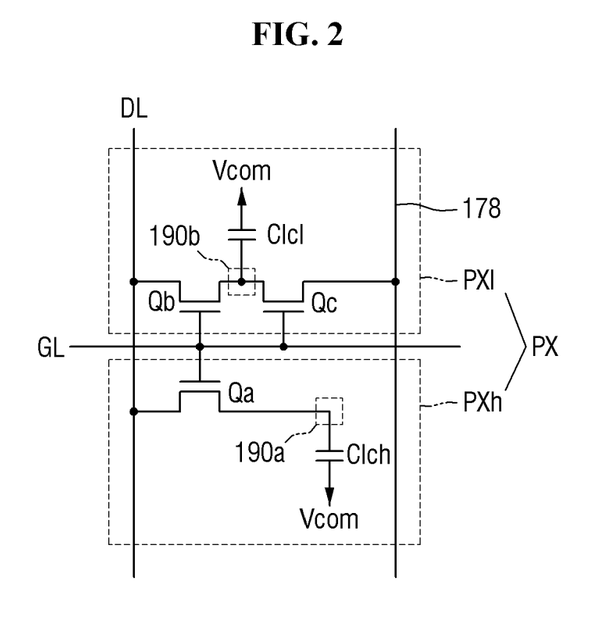
FIG. 2 is an equivalent circuit diagram illustrating an exemplary embodiment of a pixel of the LCD shown in FIG. 1.

FIG. 2 is an equivalent circuit diagram illustrating an exemplary embodiment of a pixel of the LCD shown in FIG. 1.

Referring to FIG. 2, an exemplary embodiment of the LCD 10 includes a gate line GL, which transmits a gate signal, a data line DL, which transmits a data signal, a storage line 178, which transmits a sustain voltage, and a pixel PX, which is connected to the gate line GL, the data line DL and the storage line 178.

The pixel PX includes a first subpixel PXh and a second subpixel PXl. The first and second subpixels PXh and PXl display different gray levels (or grayscale levels) from each other based on a same data voltage. In such an embodiment, where the pixel PX includes a plurality of subpixels that display different gray levels from each other, the lateral visibility may be improved through the adjustment of gamma values. Hereinafter, for convenience of description, exemplary embodiments, where the first subpixel PXh displays a relatively high gray level, and the second subpixel PXl displays a relatively low gray level, will be described. Herein, an electrode of a subpixel that displays a relatively high gray level will be referred to as a high-gray-level electrode, and an electrode of a subpixel that displays a relatively low gray level will be referred to as a low-gray-level electrode.

In an exemplar embodiment, the first subpixel PXh may include a first switching device and a first liquid crystal capacitor Clch. In such an embodiment, the second subpixel PXl may include a second switching device, a third switching device and a second liquid crystal capacitor Clcl. In such an embodiment, as shown in FIG. 2, the first switching device, the second switching device, and the third switching device include TFTs, which are tri-terminal devices having a control terminal (or a gate electrode), an input terminal (or a source electrode) and an output terminal (or a drain electrode). Hereinafter, for convenience of description, the first, second and third switching devices will be referred to as first, second and third TFTs Qa, Qb and Qc, respectively.

The first TFT Qa and the second TFT Qb may be connected to the gate line GL and the data line DL. The third TFT Qc may be connected to the gate line GL and the output terminal of the second TFT Qb.

The control terminal of the first TFT Qa may be connected to the gate line GL, the input terminal of the first TFT Qa may be connected to the data lien DL, and the output terminal of the first TFT Qa may be connected to a first end (or terminal) of the first liquid crystal capacitor Clch.

The control terminal of the second TFT Qb may be connected to the gate line GL, the input terminal of the second TFT Qb may be connected to the data lien DL, and the output terminal of the second TFT Qb may be connected to a first end of the second liquid crystal capacitor Clcl and the output terminal of the third TFT Qc.

The control terminal of the third TFT Qc may be connected to the gate line GL, the input terminal of the third TFT Qc may be connected to the storage line 178 to which a sustain voltage is applied, and the output terminal of the third TFT Qc may be connected to the first end of the second liquid crystal capacitor Clcl and the output terminal of the second TFT Qb.

In response to a gate-on voltage Von transmitted thereto through the gate line GL, the first, second and third TFTs Qa, Qb and Qc connected to the gate line GL may be turned on. Accordingly, a data voltage applied to the data line DL may be applied to a first subpixel electrode 190a, which defines the first end of the first liquid crystal capacitor Clch, via the first TFT Qa that is turned on.

Via the second and third TFTs Qb and Qc being turned on, the data voltage and a voltage divided from the sustain voltage may be applied to a second subpixel electrode 190b. If the sustain voltage is lower than the data voltage, the voltage applied to the second subpixel electrode 190b may become lower than the data voltage. Accordingly, the charged voltage of the first liquid crystal capacitor Clch may be lower than the charged voltage of the second liquid crystal capacitor Clcl. As a result, the tilt angle of liquid crystals may vary from the first subpixel PXh to the second subpixel PXl, and the luminance of the first subpixel PXh and the luminance of the second subpixel PXl may be controlled differently. By appropriately adjusting the charged voltage of the first liquid crystal capacitor Clch and the charged voltage of the second liquid crystal capacitor Clcl, an image viewed from the sides of the LCD 10 may be set to be substantially the same as or as similar as possible to an image viewed from the front of the LCD 10, and thus, lateral visibility may be improved.

The structure of a pixel of an exemplary embodiment of the LCD 10 will hereinafter be described.

Figure 3:
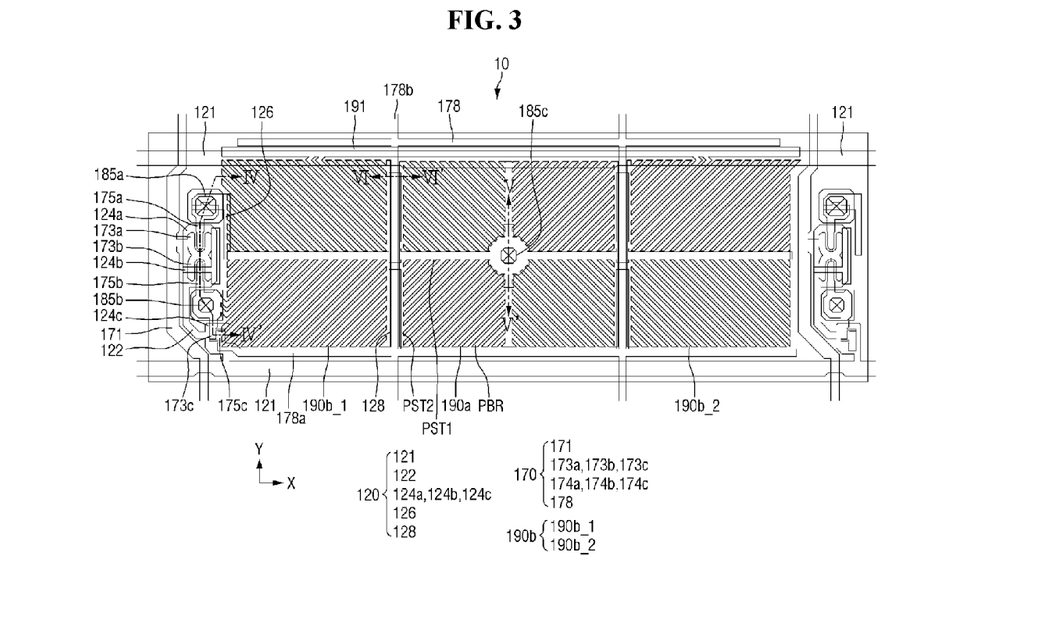
FIG. 3 is a plan view illustrating an exemplary embodiment of a pixel of the LCD shown in FIG. 1.
Figure 4:
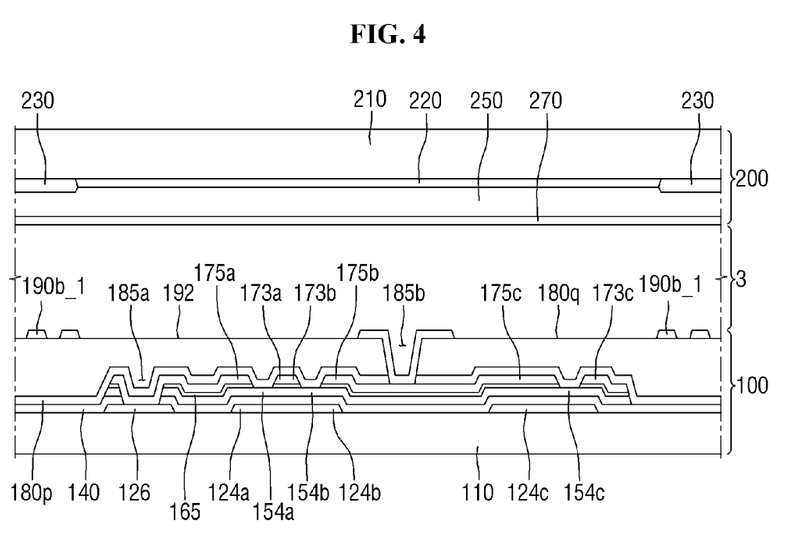
FIG. 4 is a cross-sectional view taken along line IV-IV' of FIG. 3.
Figure 5:
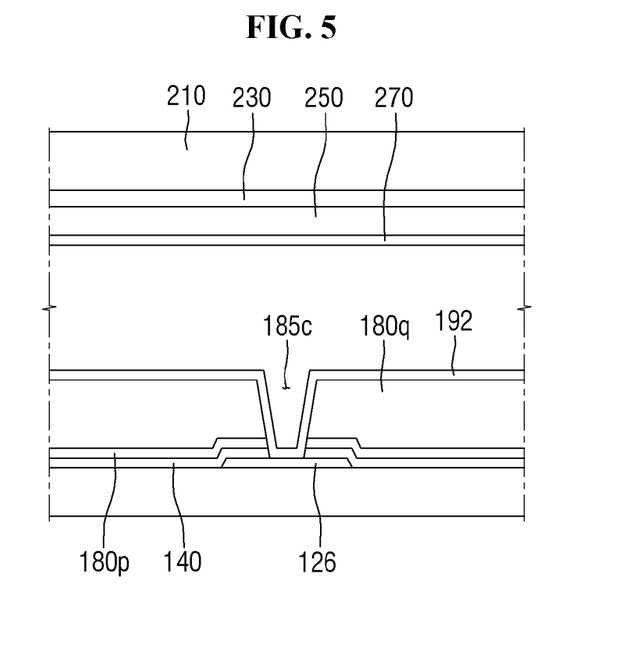
FIG. 5 is a cross-sectional view taken along line V-V' of FIG. 3.

FIG. 3 is a plan view illustrating an exemplary embodiment of a pixel of the LCD shown in FIG. 1. FIG. 4 is a cross-sectional view taken along line IV-IV' of FIG. 3. FIG. 5 is a cross-sectional view taken along line V-V' of FIG. 3.

The first display substrate 100 will hereinafter be described in detail.

Referring to FIGS. 3 to 5, the first display substrate 100 may include a first substrate 110 as a base substrate. The first substrate 110 may be an insulating substrate, for example. In one exemplary embodiment, for example, the first substrate 110 may include an insulating material such as transparent glass, quartz, ceramics, silicon or transparent plastics, but the invention is not limited thereto.

Gate wiring 120 may be disposed on the first substrate 110. The gate wiring 120 may include or be formed of an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), titanium (Ti) or a combination thereof. The gate wiring 120 may have a single layer structure or a multilayer structure including a plurality of conductive layers (not illustrated) with different physical properties from each other.

The gate wiring 120 may include a plurality of gate lines 121, a plurality of gate electrodes 124a, 124b and 124c, a plurality of gate branch lines 122, a plurality of connecting wire 126, and a plurality of light-blocking electrodes 128.

A gate line 121 may extend in a first direction X (or a horizontal direction). The gate line 121 may be disposed to extend along each pixel row.

A gate branch line 122 may be branched off from the gate line 121 for the corresponding pixel and may extend in a second direction Y (or a vertical direction). The gate branch line 122 may be disposed in the periphery of the corresponding pixel. In one exemplary embodiment, for example, the gate branch line 122 may be disposed near a data line 171.

The first, second, and third gate electrodes 124a, 124b and 124c may be disposed on, or may protrude from the gate branch line 122. Each of the gate electrodes 124a, 124b and 124c may have a larger width than the gate branch line 122, but the invention is not limited thereto. The third, second and first gate electrodes 124c, 124b and 124a may be sequentially arranged along the direction in which the gate branch line 122 extends, but the invention is not limited thereto.

A connecting wire 126 may extend in the first direction X across the center of the corresponding pixel. The connecting wire 126 may be electrically connected to a first drain electrode 175a via a first contact hole 185a, and the connecting wire 126 may be electrically connected to a first subpixel electrode 190a via a second contact hole 185b. The connecting wire 126 may include an expanded portion having an enlarged width or size in a contact area near the first and second contact holes 185a and 185b. In an exemplary embodiment, the second contact hole 185b may be located at the center of the corresponding pixel, and the connecting wire 126 may extend beyond the second contact hole 185b along the first direction X for a balance between the left and right sides of the corresponding pixel.

A light-blocking electrode 128 may be disposed to extend along the boundary between the first subpixel electrode 190a and a second subpixel electrode 190b in the second direction Y. The light-blocking electrode 128 may effectively prevent light from leaking from between the first and second subpixel electrodes 190a and 190b and being incident upon a semiconductor layer 154, which is disposed below a storage line 178. The light-blocking electrode 128 may be a floating or dummy electrode. Accordingly, the light-blocking electrode 128 may be isolated, spaced apart or disconnected from the connecting wire 126. In one exemplary embodiment, for example, the light-blocking electrode 128 may be disposed to be divided by the connecting wire 126 along a top-to-bottom direction.

A gate insulating layer 140 is disposed on the gate wiring 120. The gate insulating layer 120 may include or be formed of, for example, silicon nitride (SiNx), silicon oxide (SiO2), silicon oxynitride (SiON), or a deposition layer thereof. The first contact hole 185a, which exposes a portion of the connecting wire 126, may be defined or formed through the gate insulating layer 140.

The semiconductor layer 154 is disposed on the gate insulating layer 140. The semiconductor layer 154 may include or be formed of, for example, hydrogenated amorphous silicon or polycrystalline silicon.

The semiconductor layer 154 may be in various shapes such as an island shape or a linear shape. In an exemplary embodiment, as shown in FIGS. 3 to 5, the semiconductor layer 154 may be in an island shape. The semiconductor layer 154 may overlap data wiring 170, and may be further provided in the spaces where a plurality of source electrodes and a plurality of drain electrodes face, and are isolated from, each other.

The semiconductor layer 154 may include a first channel area 154a, which overlaps the first gate electrode 124a, a second channel area 154b, which overlaps the second gate electrode 124b, and a third channel area 154c, which overlaps the third gate electrode 124c.

A resistive contact layer 165, which includes or is formed of hydrogenated amorphous silicon doped with n-type impurities or silicide, may be disposed on the semiconductor layer 154. The resistive contact layer 165 may be located between the semiconductor layer 154, which is disposed below the resistive contact layer 165, and the source electrodes and the drain electrodes, which are disposed above the resistive contact layer 165, and may reduce the contact resistance therebetween. The resistive contact layer 165, like the semiconductor layer 154, may be in various shapes such as an island shape or a linear shape. In an exemplary embodiment, where the semiconductor layer 154 is in an island shape, the resistive contact layer 165 may also be in an island shape. In an alternative exemplary embodiment, where the semiconductor layer 154 is in a linear shape, the resistive contact layer 165 may also be in a linear shape. The resistive contact layer 165, unlike the semiconductor layer 154, may be divided into segments in the space where the source electrodes and the drain electrodes face, and are isolated from each other, and as a result, the semiconductor layer 154 may be exposed through the resistive contact layer 165.

The data wiring 170 is disposed on the resistive contact layer 165. The data wiring 170 may include or be formed of an Al-based metal such as Al or an Al alloy, a Ag-based metal such as Ag or an Ag alloy, a Cu-based metal such as Cu or a Cu alloy, a Mo-based metal such as Mo or a Mo alloy, Cr, Ta, Ti or a combination thereof. The data wiring 170 may have a single layer structure or a multilayer structure including two conductive layers (not illustrated) with different physical properties from each other.

The data wiring 170 may include a plurality of data lines 171, a plurality of source electrodes 173a, 173b and 173c, a plurality of drain electrodes 175a, 175b and 175c, and a plurality of storage lines 178.

A data line 171 may extend substantially in the second direction Y. The data line 171 may be disposed to extend along each pixel column. In an exemplary embodiment, the gate line 121 and the data line 171 may be insulated from, and intersect each other, thereby defining a pixel area, but not being limited thereto.

The source electrodes 173a, 173b and 173c include first, second and third source electrodes 173a, 173b and 173c. The first source electrode 173a may protrude from the data line 171 toward the first channel area 154a of the semiconductor layer 154. The second source electrode 173b may be connected to the data line 171 or the first source electrode 173a, and may protrude toward the second channel area 154b of the semiconductor layer 154. The third source electrode 173c may protrude from a storage line 178 toward the third channel area 154c of the semiconductor layer 154.

The drain electrodes 175a, 175b and 175c include first, second, and third drain electrodes 175a, 175b and 175c. The first drain electrode 175a may be spaced apart or isolated from the first source electrode 173a in the first channel area 154a of the semiconductor layer 154. The first drain electrode 175a may be connected to a connecting wire 126, which is disposed below the first drain electrode 175a, via the first contact hole 185a. The second drain electrode 175b may be spaced apart or isolated from the second source electrode 173b in the second channel area 154b of the semiconductor layer 154. The third drain electrode 175c may be spaced apart or isolated from the third source electrode 173c in the third channel area 154c of the semiconductor layer 154. The second and third drain electrodes 175b and 175c may be electrically connected to each other. In one exemplary embodiment, for example, the second and third drain electrodes 175b and 175c may be integrally formed as a single unitary and indivisible unit.

The first gate electrode 124a, the first source electrode 173a and the first drain electrode 175a may collectively define a first TFT Qa along with the first channel area 154a of the semiconductor layer 154. The second gate electrode 124b, the second source electrode 173b and the second drain electrode 175b may collectively define a second TFT Qb along with the second channel area 154b of the semiconductor layer 154. The third gate electrode 124c, the third source electrode 173c and the third drain electrode 175c may collectively define a third TFT Qc along with the third channel area 154c of the semiconductor layer 154.

The storage line 178 may include a first extension 178a, which extends in the first direction X, generally in parallel to the gate line 121, and a second extension 178b, which extends in the second direction Y, generally in parallel to the data line 171.

The first extension 178a may be disposed near the gate line 121, and may be disposed inside the corresponding pixel. In one exemplary embodiment, for example, one end of the first extension 178a may be connected to the third source electrode 173c, and the other end of the first extension 178a may be disposed near a data line 171 adjacent thereto.

The second extension 178b may be disposed along the boundary between the first and second subpixel electrodes 190a and 190b. The second extension 178b may extend to pass by a plurality of pixels in a row direction. The second extension 178b may overlap the light-blocking electrode 128, as shown in FIG. 3.

A first passivation film 180p is disposed on the data line 170 and an exposed portion of the semiconductor layer 154. In one exemplary embodiment, for example, the first passivation film 180p may include an inorganic insulating layer including silicon nitride or silicon oxide.

A second passivation film 180q may be disposed on the first passivation film 180p. The second passivation film 180q may include or be formed of a material having high planarization properties. In one exemplary embodiment, for example, the second passivation film 180q may include or be formed of an organic material containing a photosensitive material. In an alternative exemplary embodiment, one of the first and second passivation films 180p and 180q may be omitted.

The second contact hole 185b and a third contact hole 185c may be defined or formed through the first and second passivation films 180p and 180q. The second contact hole 185b exposes a portion of the connecting wire 126, which is connected to the center of the pixel area. The third contact hole 185c exposes the second drain electrode 175b and/or the third drain electrode 175c or parts of elements connected to the second drain electrode 175b and/or the third drain electrode 175c.

A pixel electrode 190 is disposed on the second passivation film 180q. The pixel electrode 190 may include or be formed of a transparent conductive material such as indium tin oxide ("ITO") or indium zinc oxide ("IZO"). The pixel electrode 190 will be described later in further detail.

An alignment layer (not illustrated) may be disposed on the pixel electrode 190.

The second display substrate 200 will hereinafter be described in detail.

The second display substrate 200 includes a second substrate 210 as a base substrate. The second substrate 210, like the first substrate 110, may be an insulating substrate. In one exemplary embodiment, for example, the second substrate 210 may include an insulating material such as transparent glass, quartz, ceramics, silicon or transparent plastics, but the invention is not limited thereto.

A light-shielding member 220 may be disposed on the second substrate 210. In an exemplary embodiment, a plurality of apertures, which face the pixel electrode 190 and have almost the same shape as the pixel electrode 190, may be defined in the light-shielding member 220. In such an embodiment, the light-shielding member 220 has parts corresponding to the data line 171 and the TFTs Qa, Qb and Qc, and thus effectively prevents light leakage.

A color filter 230 may be disposed for the corresponding pixel on the apertures of the light-shielding member 220. The color filter 230 may display one of three primary colors, e.g., red, green and blue.

An overcoat layer 250 may be disposed on the light-shielding member 220 and the color filter 230. In such an embodiment, the surface of the second display substrate 200 may be planarized by the overcoat layer 250.

A common electrode 270 may be disposed on the overcoat layer 250. The common electrode 270 may be integrally formed as a single unitary and indivisible unit or formed in one piece regardless of the distinction between pixels. The common electrode 270 is illustrated in FIGS. 3 to 5 as having no cutouts, but the invention is not limited thereto. In an alternative exemplary embodiment, the common electrode 270 may have cutouts at boundaries between domains. The common electrode 270 may include or be formed of a transparent conductive material such as ITO or IZO.

An alignment layer (not illustrated) may be disposed on the common electrode 270.

In an alternative exemplary embodiment, at least one of the light-shielding member 220, the color filter and the common electrode 270 may be included in the first display substrate 100.

The pixel electrode 190 will hereinafter be described in detail.

The pixel electrode 190 includes the first and second subpixel electrodes 190a and 190b. The first subpixel electrode 190a is electrically connected to the connecting wire 126 via the third contact hole 185c. The second subpixel electrode 190b is electrically connected to the second and third drain electrodes 175b and 175c via the second contact hole 185b.

The first subpixel electrode 190a is located at the center of the pixel area. The second subpixel electrode 190b may include a first electrode portion 190b_1, which is disposed at or near (e.g., next to) a side of the first subpixel electrode 190a in the first direction X, a second electrode portion 190b_2, which is disposed on the other side (e.g., an opposing side) of the first subpixel electrode 190a in the first direction X, and an electrode portion connecting pattern 191, which electrically connects the first and second electrode portions 190b_1 and 190b_2. In such an embodiment, the first subpixel electrode 190a may be disposed between the first and second electrode portions 190b_1 and 190b_2 of the second subpixel electrode 190b. The first electrode portion 190b is directly connected to the second and third drain electrodes 175b and 175c via the third contact hole 185c and thus receives a second subpixel voltage, and the second electrode portion 190b_2 receives the second subpixel voltage from the first electrode portion 190b_1 via the electrode portion connecting pattern 191. The electrode portion connecting pattern 191 may have parts extending in the first direction X. In an exemplary embodiment, where the first extension 178a of the storage line 178 is disposed on a side (i.e., a lower side) of the pixel area in the second direction Y, the electrode portion connecting pattern 191 may be disposed on the other side (e.g., an upper side) of the pixel area in the second direction Y, but the invention is not limited thereto.

In one exemplary embodiment, for example, the first subpixel electrode 190a may have a larger width in the first direction X than in the second direction Y, and the first and second electrode portions 190b_1 and 190b_2 of the second subpixel electrode 190b may have a smaller width in the first direction X than in the second direction Y. The width, in the first direction X, of the first electrode portion 190b_1 may be substantially the same as or equal to about the width, in the second direction Y, of the second electrode portion 190b_2.

In one exemplary embodiment, for example, the area of the first subpixel electrode 190a may be greater than the area of the electrode portions 190b_1 and 190b_2 of the second subpixel electrode 190b, but smaller than the area of the entire second subpixel electrode 190b. Herein, an area of a subpixel electrode may be defined by an area of a portion of a pixel area occupied by the subpixel electrode.

The pixel electrode 190 may include stems PST1 and PST2 and minute branches PBR to determine a direction of the rotation of liquid crystal molecules.

The stems PST1 and PST2 may include a horizontal stem PST1, which extends in the first direction X, and a vertical stem PST2, which extends in the second direction Y.

The minute branches PBR are branched off from the horizontal stem PST1 or the vertical stem PST2 along a diagonal direction, e.g., a direction forming an angle less than or greater than about 90 degrees with the horizontal stem PST1 or the vertical stem PST2. The minute branches PBR may extend in four different directions, i.e., an upper left direction, a lower left direction, an upper right direction, and a lower right direction. The width of the minute branches PBR may be greater than the distance between two adjacent minute branches PBR. The minute branches PBR may be substantially in the shape of a rectangle or parallelogram.

Cutouts defined between the minute branches PBR and the stems PST1 and PST2, for example, by removing an electrode material therefrom, will hereinafter be referred to as incisions.

The first subpixel electrode 190a may include a cross-shaped stem, which consists of the horizontal stem PST1 and the vertical stem PST2 intersecting the horizontal stem PST1. The horizontal stem PST1 may divide the space occupied by the first subpixel electrode 190a in upper and lower portions or halves. The vertical stem PST2 may divide the space occupied by the first subpixel electrode 190a in left and right portions or halves. The intersection between the horizontal stem PST1 and the vertical stem PST2 may have an enlarged width or be expanded, as shown in FIG. 3.

The first subpixel electrode 190a may be divided into a first domain corresponding to an upper right portion of the first subpixel electrode 190a, a second domain corresponding to an upper left portion of the first subpixel electrode 190*a*, a third domain corresponding to a lower left portion of the first subpixel electrode 190*a*, and a fourth domain corresponding to a lower right portion of the first subpixel electrode 190*a*, by the horizontal stem PST1 and the vertical stem PST2.

In an exemplary embodiment, the first subpixel electrode 190*a* may further include other vertical stems PST2 on both sides thereof in the first direction X. In one exemplary embodiment, for example, the first subpixel electrode 190*a* may include one horizontal stem PST1 and three vertical stems PST2. In such an embodiment, the vertical stems PST2 on both sides of the first subpixel electrode 190*a* face the first and second electrode portions 190*b*_1 and 190*b*_2 of the second subpixel electrode 190*b*.

The first subpixel electrode 190*a* may further include a plurality of minute branches PBR branched off from the horizontal stem PST1 and/or the vertical stems PST2.

In the upper right portion of the first subpixel electrode 190*a*, the minute branches PBR may extend in an upper right diagonal direction at an angle of, for example, about 45 degrees.

In the upper left portion of the first subpixel electrode 190*a*, the minute branches PBR may extend in an upper left diagonal direction at an angle of, for example, about 135 degrees.

In the lower left portion of the first subpixel electrode 190*a*, the minute branches PBR may extend in a lower left diagonal direction at an angle of, for example, about −135 degrees.

In the lower right portion of the first subpixel electrode 190*a*, the minute branches PBR may extend in a lower right diagonal direction at an angle of, for example, about −45 degrees.

Some or all of the minute branches PBR extending from the horizontal stem PST1 of the first subpixel electrode 190*a* may be connected to the vertical stem PST2 at or near a side of the first subpixel electrode 190*a*. Some or all of the minute branches PBR extending from the vertical stem PST2 in the middle of the first subpixel electrode 190*a* may not be connected to the vertical stem PST2. The incisions may be defined between the minute branches PBR.

The first electrode portion 190*b*_1 of the second subpixel electrode 190*b* includes a plurality of minute branches PBR extending from the horizontal stem PST1 and the vertical steam PST2 at or near a side of the first electrode portion 190*b*_1. The horizontal stem PST1 of the first electrode portion 190*b*_1 divides the space occupied by the first electrode portion 190*b*_1 into upper and lower portions of halves. The vertical stem PST2 of the first electrode portion 190*b*_1 may be disposed at or near a side of the first electrode portion 190*b*_1 near the first subpixel electrode 190*a*.

The first electrode portion 190*b*_1 of the second subpixel electrode 190*b* may be divided into a first domain corresponding to an upper portion of the first electrode portion 190*b*_1, and a second domain corresponding to a lower portion of the first electrode portion 190*b*_1, by the horizontal stem PST1 and the vertical stem PST2 at or near a side of the first electrode portion 190*b*_1.

The first electrode portion 190*b*_1 includes the minute branches PBR branched off from the horizontal stem PST1 and/or the vertical stem PST2 at or near a side of the first electrode portion 190*b*_1.

In the upper portion of the first electrode portion 190*b*_1, the minute branches PBR may extend in the upper left diagonal direction at an angle of, for example, about 135 degrees. A direction of the extension of the minute branches PBR in the upper portion of the first electrode portion 190*b*_1 may be substantially the same as a direction of the extension of the minute branches PBR in the upper left portion of the first subpixel electrode 190*a* near the first electrode portion 190*b*_1.

In the lower portion of the first electrode portion 190*b*_1, the minute branches PBR may extend in the lower left diagonal direction at an angle of, for example, about −135 degrees. A direction of the extension of the minute branches PBR in the lower portion of the first electrode portion 190*b*_1 may be substantially the same as a direction of the extension of the minute branches PBR in the lower left portion of the first subpixel electrode 190*a* near the first electrode portion 190*b*_1.

The second electrode portion 190*b*_2 of the second subpixel electrode 190*b* includes a plurality of minute branches PBR branched off from the horizontal stem PST1 and/or the vertical stem PST2 at or near a side of the second electrode portion 190*b*_2. The horizontal stem PST1 of the second electrode portion 190*b*_2 divides the space occupied by the second electrode portion 190*b*_2 into upper and lower portions. The vertical stem PST2 of the second electrode portion 190*b*_2 may be disposed at or near a side of the second electrode portion 190*b*_2 near the first subpixel electrode 190*a*.

The second electrode portion 190*b*_2 of the second subpixel electrode 190*b* may be divided into a first domain corresponding to an upper portion of the second electrode portion 190*b*_2, and a second domain corresponding to a lower portion of the second electrode portion 190*b*_2, by the horizontal stem PST1 and the vertical stem PST2 at or near a side of the second electrode portion 190*b*_2.

The second electrode portion 190*b*_2 of the second subpixel electrode 190*b* includes the minute branches PBR branched off from the horizontal stem PST1 and/or the vertical stem PST2 at or near a side of the second electrode portion 190*b*_2.

In the upper portion of the second electrode portion 190*b*_2, the minute branches PBR may extend in the upper right diagonal direction at an angle of, for example, about 45 degrees. A direction of the extension of the minute branches PBR in the upper portion of the second electrode portion 190*b*_2 may be substantially the same as a direction of the extension of the minute branches PBR in the upper right portion of the first subpixel electrode 190*a* near the second electrode portion 190*b*_2.

In the lower portion of the second electrode portion 190*b*_2, the minute branches PBR may extend in the lower right diagonal direction at an angle of, for example, about −45 degrees. A direction of the extension of the minute branches PBR in the lower portion of the second electrode portion 190*b*_2 may be substantially the same as a direction of the extension of the minute branches PBR in the lower right portion of the first subpixel electrode 190*a* near the second electrode portion 190*b*_2.

The electrode portion connecting pattern 190*b*_3 may connect some of the minute branches PBR in the upper portion of the first electrode portion 190*b*_1 and some of the minute branches PBR in the upper portion of the second electrode portion 190*b*_2.

In response to a subpixel voltage being applied to the first and second subpixel electrodes 190*a* and 190*b*, horizontal components of an electric field that determine the tilt direction of liquid crystal molecules 31 may be generated in the incisions between the minute branches PBR of each of the first and second subpixel electrodes 190*a* and 190*b*. The horizontal components may be parallel to a longitudinal direction of the minute branches PBR. Accordingly, the liquid crystal molecules 31, which have negative dielectric anisotropy, may rotate in a direction parallel to the longitudinal direction of the minute branches PBR.

In an exemplary embodiment, as described above, the first subpixel electrode 190a is divided into four different subpixel areas that differ from one another in terms of the longitudinal direction of the minute branches PBR. Accordingly, the liquid crystal molecules 31 may be tilted in the first subpixel electrode 190a in four different directions, and as a result, four domains that differ from one another in terms of a direction of alignment of the liquid crystal molecules 31 may be defined by the first subpixel electrode 190a.

Each of the first and second electrode portions 190b_1 and 190b_2 of the second subpixel electrode 190b is divided into a plurality of subpixel areas, e.g., two subpixel areas that differ from each other in terms of the longitudinal direction of the minute branches PBR. Accordingly, two domains that differ from each other in terms of a direction of alignment of the liquid crystal molecules 31 may be defined by the two areas of each of the first and second electrode portions 190b_1 and 190b_2 of the second subpixel electrode 190b.

Therefore, in such an embodiment, the rotation direction of the liquid crystal molecules 31 in both the upper left portion of the first subpixel electrode 190a and the upper portion of the second subpixel electrode 190b may become substantially the same as the upper left direction. In such an embodiment, the rotation direction of the liquid crystal molecules 31 in both the lower left portion of the first subpixel electrode 190a and the lower portion of the second subpixel electrode 190b may become substantially the same as the lower left direction. In such an embodiment, the rotation direction of the liquid crystal molecules 31 in both the upper right portion of the first subpixel electrode 190a and the upper portion of the second subpixel electrode 190b may become substantially the same as the upper right direction. In such an embodiment, the rotation direction of the liquid crystal molecules 31 in both the lower right portion of the first subpixel electrode 190a and the lower portion of the second subpixel electrode 190b may become substantially the same as the lower right direction.

In an exemplary embodiment, as discussed above, the longitudinal direction of the minute branches PBR is uniform between areas of the first and second subpixel electrodes 190a and 190b that face each other in the first direction X, such that the occurrence of texture may be substantially reduced even if a misalignment occurs between the first and second display substrates 100 and 200 of, for example, a curved LCD.

Figure 6:
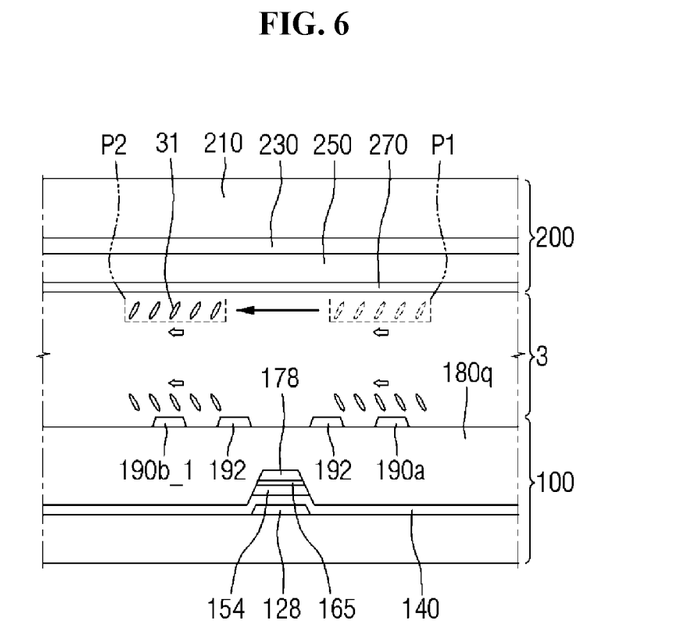
FIG. 6 is a cross-sectional view taken along line VI-VI' of FIG. 3.

The degradation of picture quality that may occur in a curved LCD will hereinafter be described with reference to FIG. 6. FIG. 6 is a cross-sectional view taken along line VI-VI' of FIG. 3, and illustrates a misalignment that may occur between the first and second display substrates 100 and 200 of, for example, a curved display panel.

Referring to FIG. 6, in an exemplary embodiment of the LCD 10 being curved in the first direction X, the second substrate 200 may be moved to a side, for example, to the left. When the second substrate 200 is moved to the left, liquid crystal molecules 31 in a first section P1 may be moved to a second section P2, for example, liquid crystal molecules in the upper left portion of the first subpixel electrode 190a may be moved to the upper portion of the first electrode portion 190b_1 of the second subpixel electrode 190b.

If the direction of the extension of the minute branches PBR in the upper portion of the first electrode portion 190b_1 differs from the direction of the extension of the minute branches PBR in the upper left portion of the first subpixel electrode 190a, texture may be generated. In an exemplary embodiment, the direction of the extension of the minute branches PBR in the first subpixel electrode 190a is substantially the same as the direction of the extension of the minute branches PBR in the second subpixel electrode 190b, such that liquid crystal molecules 31 near the first subpixel electrode 190a and liquid crystal molecules 31 near the first electrode portion 190b_1 of the first subpixel electrode 190b may both be tilted in the same direction. As a result, in such an embodiment, the occurrence of texture may be reduced.

In such an embodiment, the direction of the extension of the minute branches PBR is uniformly maintained in the first electrode portion 190b_1 or the second electrode portion 190b_2 of the second subpixel electrode 190b to be a horizontal direction. Accordingly, the occurrence of texture may be reduced even if a misalignment occurs in the first electrode portion 190b_1 or the second electrode portion 190b_2 of the second subpixel electrode 190b.

An LCD according to another exemplary embodiment of the invention will hereinafter be described. Like reference numerals indicate like elements, and thus, detailed descriptions thereof will be omitted.

Figure 7:
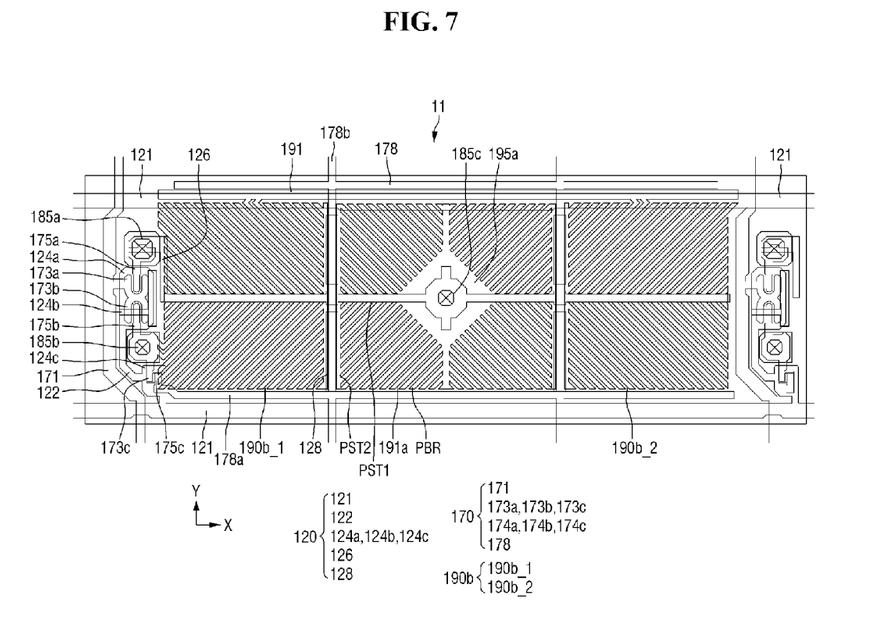
FIG. 7 is a plan view illustrating an LCD according to an alternative exemplary embodiment of the invention.

FIG. 7 is a plan view illustrating an LCD according to another exemplary embodiment of the invention.

In an alternative exemplary embodiment of an LCD 11, as illustrated in FIG. 7, a first subpixel electrode 191a includes a first plate 195a. Herein, a plate of a subpixel electrode means a portion having a shape of a plate, e.g., a relatively wide portion or an expanded portion thereof. The first plate 195a may be disposed at the intersection between a horizontal stem PST1 and a vertical stem PST2 that crosses the horizontal stem PST1 at right angles. The first plate 195a may be in the shape of a parallelogram or rhombus having at the center thereof a cross-shaped stem where the horizontal stem PST1 and the vertical stem PST2 meet. The first plate 195a may be in the shape of a flat plate connecting the horizontal stem PST1 and the vertical stem PST2 of the cross-shaped stem. The vertices of the first plate 195a may be located on the horizontal stem PST1 and the vertical stem PST2. The first plate 195a may be in the shape of a rhombus or square. A direction of the extension of each of the sides of the first plate 195a may be perpendicular to a direction of the extension of minute branches PBR branched off there from, but the invention is not limited thereto. A length of one of the sides of the first plate 195a may be smaller than half the length of the length, in a horizontal direction (or an X-axis direction), of the first subpixel electrode 190a or half the length of the length, in a vertical direction (or a Y-axis direction), of the first subpixel electrode 190a, but the invention is not limited thereto.

In such an embodiment, where the first subpixel electrode 190a includes the first plate 195a, the control of liquid crystal molecules in the first subpixel electrode 190a may be improved due to a fringe field generated by the sides of the first plate 195a.

Figure 8:
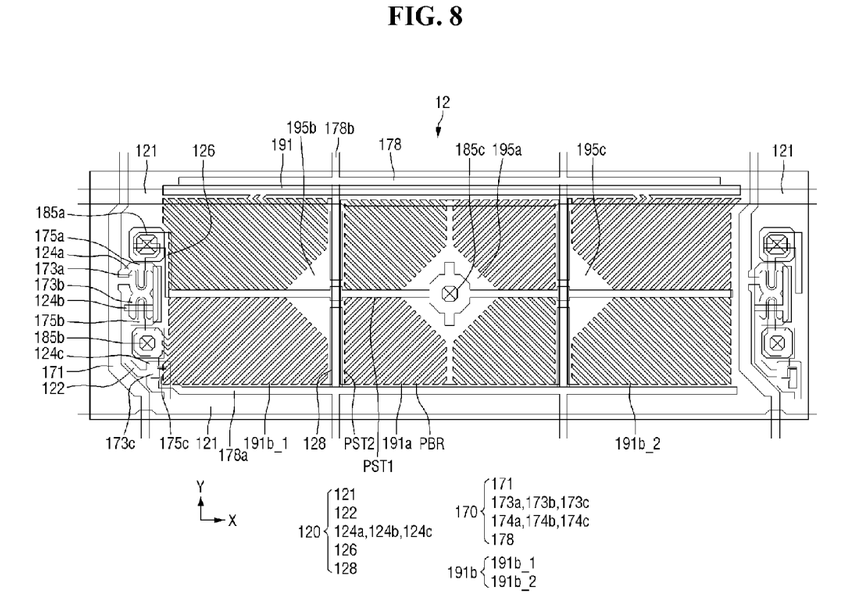
FIG. 8 is a plan view illustrating an LCD according to another alternative exemplary embodiment of the invention.

FIG. 8 is a plan view illustrating an LCD according to another exemplary embodiment of the invention.

In another alternative exemplary embodiment of an LCD 12, as illustrated in FIG. 8, a first subpixel electrode 191a includes a first plate 195a, a first electrode portion 191b_1 of a second subpixel electrode 191b includes a second plate 195b, and a second electrode portion 191b_2 of the second subpixel electrode 191b includes a third plate 195c. In such an embodiment, the first plate 195a is substantially the same as that described above with reference to FIG. 7, and thus, any repetitive detailed description thereof will be omitted, and the second and third plates 195b and 195c will be described in detail.

The second plate 195b may be disposed at the intersection between a horizontal stem PST1 and a vertical stem PST2 of the second subpixel electrode 190b that crosses the horizontal stem PST1 at right angles. The second plate 195b may be in the shape of an equilateral triangle, the center of the base side of which is positioned at the intersection between a vertical stem PST2 on a right side of (or next to in an X-axis direction) the second subpixel electrode 190b and the horizontal stem PST1. Two apexes of the second plate 195b may be located on the vertical stem PST2 on the right side of the second subpixel electrode 190b, and the other apex of the second plate 195b may be located on the horizontal stem PST1.

A direction of the extension of each of the sides of the second plate 195b or the third plate 195c may be perpendicular to a direction of the extension of minute branches PBR branched off there from, but the invention is not limited thereto. A length of one of the sides of the second plate 195b may substantially the same as or equal to about a length of one of the sides of the first plate 195a, but the invention is not limited thereto.

In such an embodiment, the second subpixel electrode 190b includes the second and third plates 195b and 195c. Accordingly, the control of liquid crystal molecules in the second subpixel electrode 190b may be improved due to a fringe field generated by the sides of the second plate 195b.

While the invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display, comprising:
   a first display substrate comprising a plurality of pixel electrodes corresponding to a plurality of pixels, respectively;
   a second display substrate disposed opposite to the first display substrate; and
   a liquid crystal layer disposed between the first and second display substrates,
   wherein
   each of the pixel electrodes comprises: first and second subpixel electrodes, which are disposed near each other in a first direction,
   each of the first and second subpixel electrodes comprises a plurality of minute branches,
   the first subpixel electrode is divided into a plurality of first-subpixel areas including a first first-subpixel area, in which the minute branches extend in a first diagonal direction, which forms an acute angle with the first direction, and
   the second subpixel electrode is divided into a plurality of second-subpixel areas including a first second-subpixel area, which is contiguous to the first first-subpixel area in the first direction and in which the minute branches extend in the first diagonal direction.

2. The liquid crystal display of claim 1, wherein
   the first-subpixel areas further includes a second first-subpixel area, which is disposed near the first first-subpixel area in a second direction crossing the first direction and in which the minute branches extend in a second diagonal direction crossing the first diagonal direction, and
   the second-subpixel areas further includes a second second-subpixel area, which is disposed near the first second-subpixel area in the second direction and in which the minute branches extend in the second diagonal direction,
   wherein the second first-subpixel area is disposed near the second second-subpixel area in the first direction.

3. The liquid crystal display of claim 2, wherein
   the first-subpixel areas further includes:
   a third first-subpixel area, which is disposed near the first first-subpixel area in the first direction and in which the minute branches extend in a third diagonal direction crossing the first diagonal direction, and
   a fourth first-subpixel area, which is disposed near the second first-subpixel area in the first direction, and in which the minute branches extend in a fourth diagonal direction crossing the second diagonal direction.

4. The liquid crystal display of claim 2, wherein
   the first subpixel electrode is a high-gray-level electrode, and
   the second subpixel electrode is a low-gray-level electrode.

5. The liquid crystal display of claim 2, wherein each of the first and second subpixel electrodes further comprises a stem which extends in at least one of the first and second directions and to which the minute branches are connected.

6. The liquid crystal display of claim 5, wherein the stem and the minute branches form an angle of about ±45 or about ±135 degrees.

7. The liquid crystal display of claim 5, wherein the first and second display substrates are bent in the first direction.

8. The liquid crystal display of claim 1, wherein the minute branches are in a shape of a rectangle or a parallelogram.

9. A liquid crystal display, comprising:
   a first display substrate including a plurality of pixel electrodes corresponding to a plurality of pixels, respectively;
   a second display substrate disposed opposite to the first display substrate; and
   a liquid crystal layer disposed between the first and second display substrates,
   wherein
   each of the pixel electrodes comprises first and second subpixel electrodes, which are disposed contiguous to each other in a first direction,
   each of the first and second subpixel electrodes comprises a plurality of minute branches,
   the second subpixel electrode comprises:
   a first electrode portion, which is disposed near a side of the first subpixel electrode;
   a second electrode portion, which is disposed near another side of the first subpixel electrode; and
   an electrode portion connecting pattern, which connects the first and second electrode portions,
   the first subpixel electrode is divided into a first first-subpixel area, in which the minute branches extend in a first diagonal direction, which forms an acute angle with the first direction, a second first-subpixel area, which is contiguous to the first first-subpixel area in a second direction crossing the first direction and in which the minute branches extend in a second diagonal direction crossing the first diagonal direction, a third first-subpixel area, which is contiguous to the first first-subpixel area in the first direction and in which the minute branches extend in a third diagonal direction crossing the first diagonal direction, and a fourth first-subpixel area, which is contiguous to the second first-subpixel area in the first direction, and in which the minute branches extend in a fourth diagonal direction crossing the second diagonal direction, the first electrode portion of the second subpixel electrode is divided into a first first-electrode-portion area, which is contiguous to the first first-subpixel area in the first direction and in which the minute branches extend in the first diagonal direction, and a second first-electrode-portion area, which is contiguous to the second first-subpixel area in the first direction and in which the minute branches extend in the second diagonal direction, and the second electrode portion of the second subpixel electrode is divided into a first second-electrode-portion area, which is contiguous to the third first-subpixel area in the first direction and in which the minute branches extend in the third diagonal direction, and a second second-electrode-portion area, which is contiguous to the fourth first-subpixel area in the first direction and in which the minute branches extend in the fourth diagonal direction.

10. A liquid crystal display, comprising:
a first display substrate including a plurality of pixel electrodes corresponding to a plurality of pixels, respectively;
a second display substrate disposed opposite to the first display substrate; and
a liquid crystal layer disposed between the first and second display substrates,
wherein
each of the pixel electrodes comprises first and second subpixel electrodes, which are disposed near to each other in a first direction,
each of the first and second subpixel electrodes comprises a plurality of minute branches,
the second subpixel electrode comprises:
a first electrode portion, which is disposed near a side of the first subpixel electrode;
a second electrode portion, which is disposed near another side of the first subpixel electrode; and
an electrode portion connecting pattern, which connects the first and second electrode portions,
the first subpixel electrode is divided into a first first-subpixel area, in which the minute branches extend in a first diagonal direction, a second first-subpixel area, which is disposed near the first first-subpixel area in a second direction crossing the first direction and in which the minute branches extend in a second diagonal direction crossing the first diagonal direction, a third first-subpixel area, which is disposed near the first first-subpixel area in the first direction and in which the minute branches extend in a third diagonal direction crossing the first diagonal direction, and a fourth first-subpixel area, which is disposed near the second first-subpixel area in the first direction, and in which the minute branches extend in a fourth diagonal direction crossing the second diagonal direction,
the first electrode portion of the second subpixel electrode is divided into a first first-electrode-portion area, which is disposed near the first first-subpixel area in the first direction and in which the minute branches extend in the first diagonal direction, and a second first-electrode-portion area, which is disposed near the second first-subpixel area in the first direction and in which the minute branches extend in the second diagonal direction, the second electrode portion of the second subpixel electrode is divided into a first second-electrode-portion area, which is disposed near the third first-subpixel area in the first direction and in which the minute branches extend in the third diagonal direction, and a second second-electrode-portion area, which is disposed near the fourth first-subpixel area in the first direction and in which the minute branches extend in the fourth diagonal direction, the first display substrate further comprises first, second and third thin-film transistors, the first thin-film transistor provides a first subpixel voltage to the first subpixel electrode, and the second thin-film transistor provides a second subpixel voltage to the second subpixel electrode along with the third TFT.

11. The liquid crystal display of claim 9, wherein
the first subpixel electrode is a high-gray-level electrode, and
the second subpixel electrode is a low-gray-level electrode.

12. The liquid crystal display of claim 11, wherein each of the first and second subpixel electrodes further comprises a stem which extends in at least one of the first and second directions and to which the minute branches are connected.

13. The liquid crystal display of claim 12, wherein the stem and the minute branches form an angle of about ±45 or about ±135 degrees.

14. The liquid crystal display of claim 12, wherein the first and second display substrates are bent in the first direction.

15. The liquid crystal display of claim 9, wherein the minute branches are in a shape of a rectangle or a parallelogram.

16. The liquid crystal display of claim 9, wherein a width, in the first direction, of the first subpixel electrode is greater than a width, in the second direction, of the first subpixel electrode.

17. The liquid crystal display of claim 9, wherein a width, in the first direction, of the first electrode portion of the second subpixel electrode is greater than a width, in the first direction, of the first first-subpixel area.

18. The liquid crystal display of claim 9, wherein the first and second electrode portions of the second subpixel electrode have a smaller width in the first direction than in the second direction.

19. The liquid crystal display of claim 9, wherein an area of the first subpixel electrode is larger than an area of each of the first and second electrode portions of the second subpixel electrode.

20. The liquid crystal display of claim 12, wherein the first subpixel electrode further comprises a cross-shaped stem comprising a horizontal stem and a vertical stem crossing the horizontal stem.

* * * * *